Jan. 9, 1968   J. E. KUMMERER   3,362,467
VARIABLE EMITTER DEVICE
Filed March 31, 1965   3 Sheets-Sheet 1

INCREASED
HEAT FLOW

JAMES E. KUMMERER
INVENTOR.

BY
Claude Funkhouser
ATTORNEY

Jan. 9, 1968  J. E. KUMMERER  3,362,467
VARIABLE EMITTER DEVICE
Filed March 31, 1965  3 Sheets-Sheet 2

JAMES E. KUMMERER
INVENTOR.

BY
ATTORNEY

Jan. 9, 1968                J. E. KUMMERER                3,362,467
                          VARIABLE EMITTER DEVICE
Filed March 31, 1965                                    3 Sheets-Sheet 3

JAMES E. KUMMERER
INVENTOR.

BY
Claude Funkhouser
ATTORNEY

United States Patent Office 3,362,467
Patented Jan. 9, 1968

3,362,467
VARIABLE EMITTER DEVICE
James E. Kummerer, Laurel, Md., assignor to the United States of America as represented by the Secretary of the Navy
Filed Mar. 31, 1965, Ser. No. 444,470
6 Claims. (Cl. 165—86)

The present invention relates to heat transferring and/or dissipating apparatus and, more particularly, to such apparatus comprising means having variable heat radiating or emitting capabilities especially adapted for stabilizing the internal temperature of an enclosed structure such as an artifical satellite or spacecraft in outer space, for example.

Present day artificial satellites and spacecraft contain complex electronic instrumentation whose operation is often adversely affected by excess temperatures within the satellite or spacecraft. Accordingly, it is desirable to equip the satellite or spacecraft with heat dissipating apparatus effective to dissipate any excess internal heat generated, for example, by the electronic components, so as to stabilize or maintain a proper temperature level within such satellite or spacecraft.

Prior art heat dissipating systems for this purpose have generally been active rather than passive; i.e., they generate as well as dissipate heat, and thus are relatively ineffective since they produce internal heating of the satellite or spacecraft which may already have an excessively high internal temperature.

In view of the above, it is proposed in accordance with the present invention to provide effective heat transferring apparatus which functions in a completely passive manner; i.e., without generating heat.

A further object of the present invention is to provide apparatus of the type described especially adapted for stabilizing the internal temperature of a satellite or spacecraft, in outer space.

A further object of the present invention is the provision of a heat radiator whose thermal emissivity is variable in accordance with the amount of heat to which it is subjected.

Other objects and many of the attendant advantages of the present invention will be readily appreciated as the same becomes better understood by reference to the following detailed description when considered in connection with the accompanying drawings wherein.

In accordance with the presently preferred embodiment of this invention, the improved heat transferring apparatus includes a flexible honeycomb member constructed of heat emitting or radiating material disposed to have the honeycomb cells thereof opened and closed dependent upon flexing of a bimetallic plate member which is exposed to the internal temperature of the satellite or other enclosed structure for which internal temperature stabilization is desired. For example, as the temperature within the satellite increases, the bimetallic plate flexes or deforms from its normal, flat configuration into an arcuate configuration. This flexing of the plate opens the honeycomb cells of the heat radiating member and causes more heat to be emitted therefrom to the exterior of the satellite. Conversely, as the internal temperature of the satellite decreases, the bimetallic plate tends to return to its normal flat configuration and, in so doing, closes the honeycomb member to reduce the amount of heat radiated thereby. Therefore, it is seen that the amount of heat radiated by the honeycomb member varies directly with the internal satellite temperature and, in this manner, the apparatus of the present invention functions in a completely passive way to stabilize such internal temperature.

Figure 1:
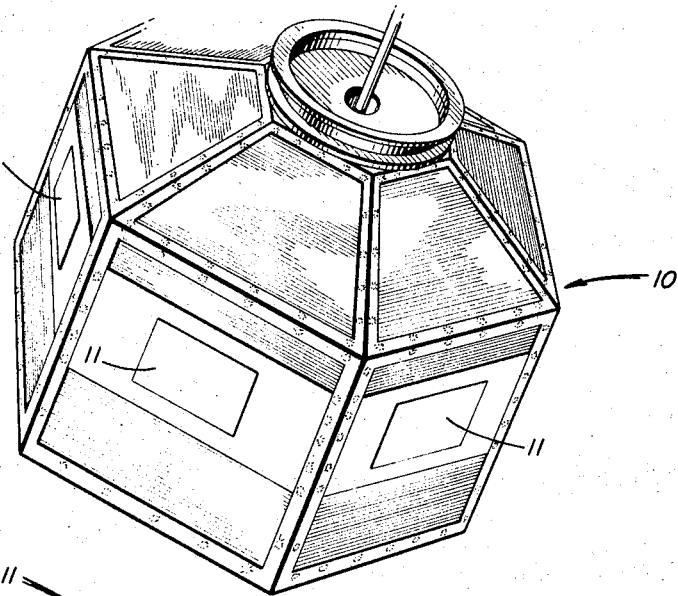
FIG. 1 is a pictorial representation of a typical satellite equipped with heat transferring apparatus according to one embodiment of the present invention effective to stabilize the internal temperature of the satellite.

Referring now to FIG. 1, the improved heat transferring apparatus of this invention is illustrated as being mounted in the side walls of a typical satellite 10, as designated by the reference numerals 11, for the purpose of stabilizing the internal temperature of the satellite 10, so as to prevent deleterious over-heating of the instrumentation and other electronic equipment contained therein, by transferring and externally dissipating any excess heat generated within the satellite 10. It should be understood at this point, however, that the heat transferring apparatus provided by the present invention is not restricted to such satellite use, but, is adaptive for use wherever it is desirable to stabilize or regulate the internal temperature of an enclosed structure.

Figure 2:
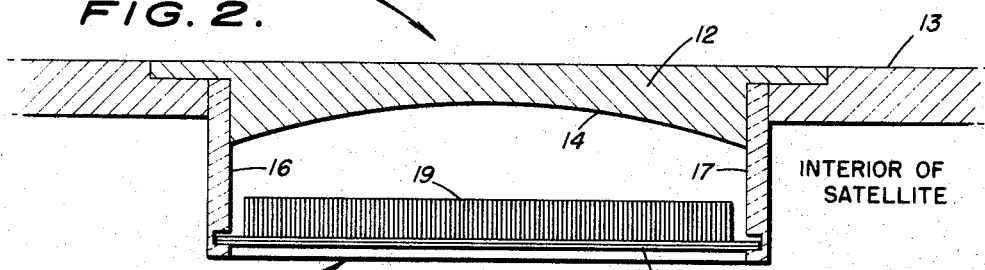
FIG. 2 is an enlarged cross-sectional illustration of heat transferring apparatus according to the same embodiment of the present invention shown in FIG. 1 when in a low heat radiating configuration.
Figure 3:
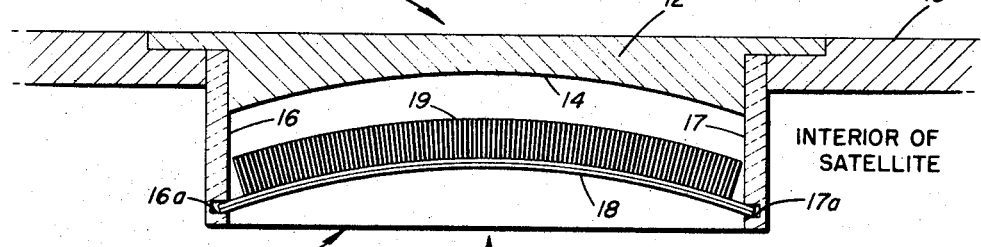
FIG. 3 is a view similar to FIG. 2, but showing the heat transferring apparatus when in a high heat radiating configuration.
Figure 6:
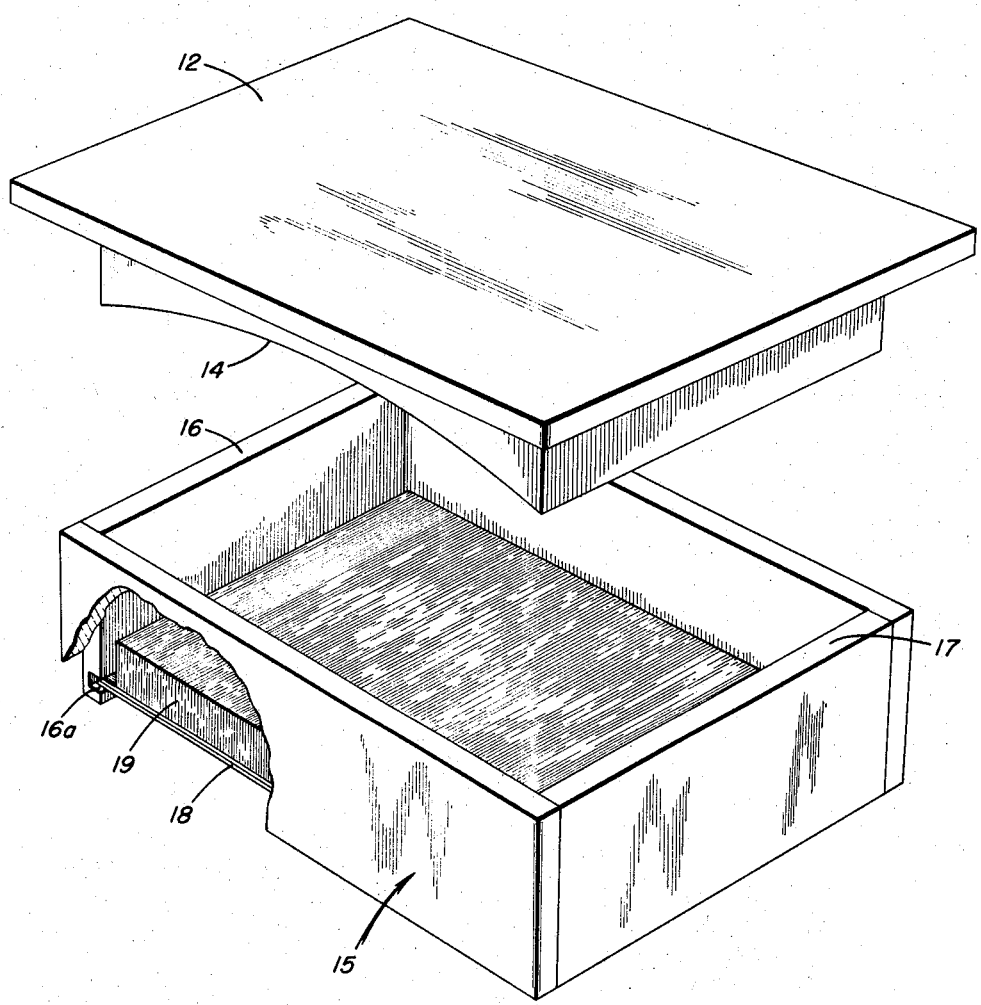
FIG. 6 is a perspective view of the heat transferring apparatus of this invention, partly broken away and partly detached, to expose the interior of the apparatus.

The structural details of the illustrated embodiment of this invention are more particularly shown in FIG. 6 of the drawings and include a metallic heat receptor member 12 which is configured with a flanged outer surface adapted to be securely mounted, as seen in FIGS. 2 and 3, flush within a suitable opening in the exterior wall 13 of the satellite 10. The member 12 is furthermore formed with a concave interior surface 14 and functions to externaly radiate (to surrounding space) any internal heat received by this concave surface 14. If desired, the member 12 may be corrugated to increase the effective surface area thereof.

Referring to FIG. 6, a rectangular, open end box 15 of heat insulating material is employed and is dimensioned to receive and surround the lower concave portion of the heat receptor member 12, when it is mounted in the satellite wall 13, as clearly illustrated in the sectional views of FIGS. 2 and 3. Two opposite side walls 16 and 17 of the insulating box 15 are formed, along their inner surfaces, with laterally extending notches 16a and 17a respectively. These notches 16a and 17a receive and support opposite ends of a bimetallic plate member 18 in such a manner that the under surface of the bimetallic plate 18 is exposed to the internal temperature of the satellite 10. Furthermore, the width of the bimetallic plate 18 is slightly less than that of the insulating box 15 (see FIG. 6), so that the bimetallic plate 18 is free to flex or bend within the insulating box 15, for purposes to be described in detail hereinafter.

Figure 4:
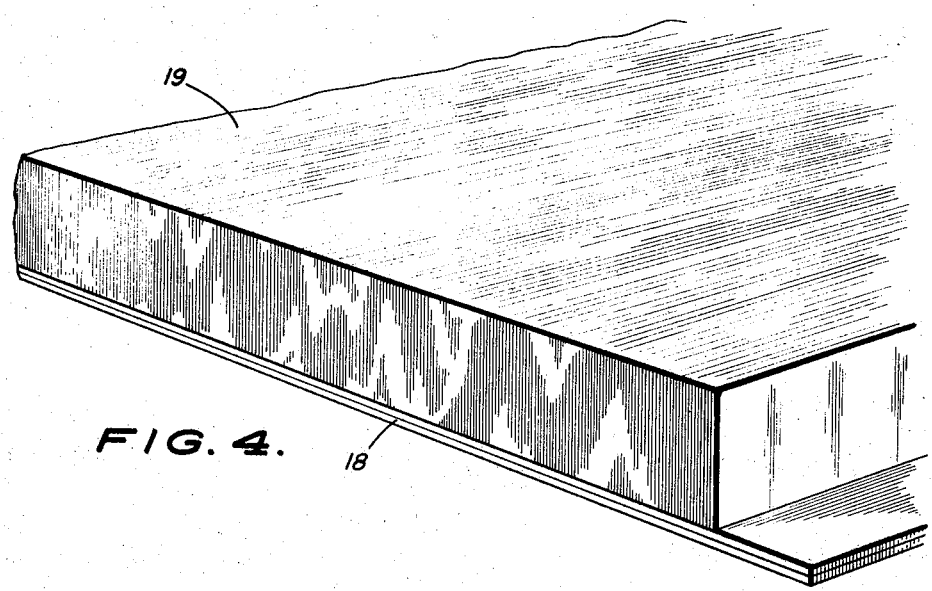
FIG. 4 is an enlarged pictorial illustration of the variable heat radiating portion of the apparatus of this invention in low heat radiating configuration.
Figure 5:
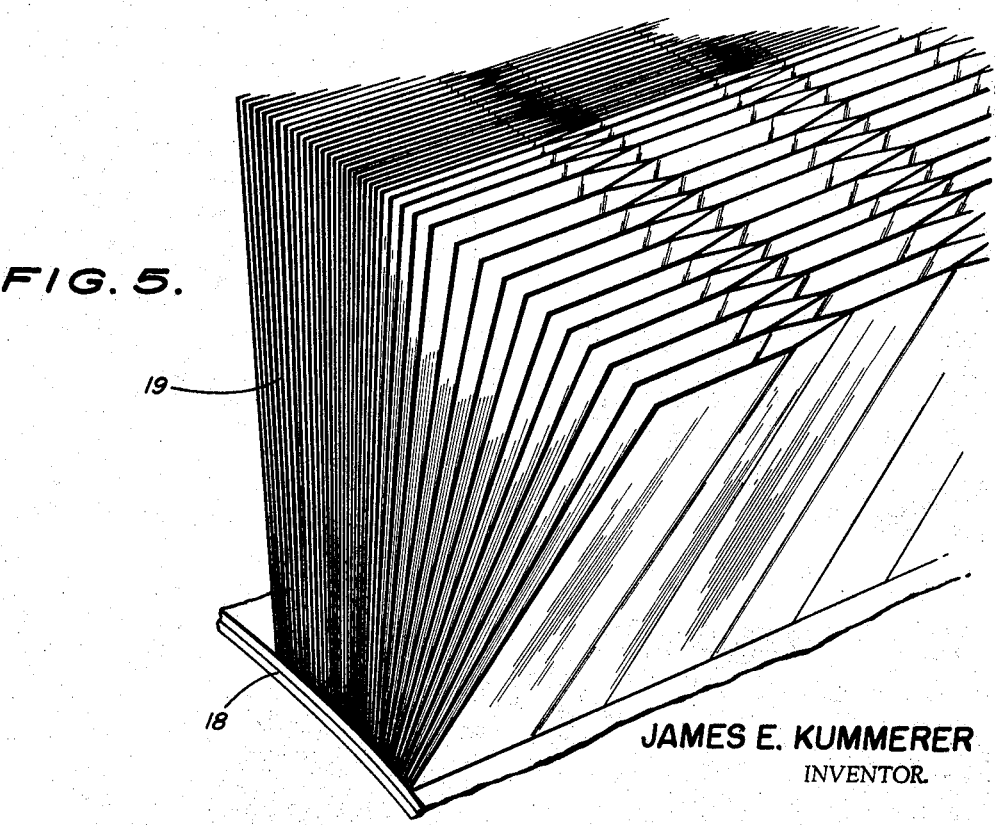
FIG. 5 is an enlarged pictorial illustration of the variable heat radiator of FIG. 4 in a high heat radiating configuration.

A honeycomb member 19 is suitably bonded to the upper surface of the bimetallic plate 18 facing the heat receptor member 12 and is preferably constructed of a metal having the desired heat emitting or radiating capability. More specifically, the honeycomb member 19 serves as a variable heat emitter or radiator having a thermal emissivity dependent upon the flexing of the bimetallic plate member 18; i.e. when the bimetallic plate 18 is unflexed or flat (see FIGS. 2 and 4), the honeycomb member 19 is closed and thus has a relatively low thermal emissivity, whereas, when the bimetallic plate 18 is flexed or bent (see FIGS. 3 and 5), the cells of the honeycomb member are opened, as clearly depicted in FIG. 5, and it then possesses a relatively high thermal emissivity. In other words, the honeycomb member 19 is opened or closed, to vary its heat radiating capability, dependent upon the degree of flexure of the bimetallic plate 18.

As mentioned previously, the illustrated heat transferring device provided by this invention has particular utility as a completely passive means for stabilizing the internal temperature of the illustrated satellite 10 in FIG. 1. For example, a plurality of such heat transferring devices could be mounted in the side walls of the satellite 10, as represented by the reference numerals 11. The particular way in which a typical device is mounted in the satellite wall is illustrated in FIGS. 2 and 3. When the internal temperature of the satellite is relatively low or normal the bimetallic plate member 18 is substantially unflexed or flat (FIG. 2) and the honeycomb member 19 is closed. In this configuration, the honeycomb member 19 radiates a relatively small amount of heat towards the heat receptor member 12.

If the internal temperature of the satellite increases (FIG. 3), the bimetallic plate 18 flexes outwardly and bends the honeycomb member 19 into an arcuate shape. In this configuration, the cells of the honeycomb member 19 are opened and the effective heat radiating surface area thereof is thus proportionately increased, so that it is now capable of radiating an increased amount of heat towards the heat receptor 12. This increase in the amount of heat transferred by the apparatus is diagrammatically represented, in FIG. 3, by the vertical arrow labelled IN-CREASED HEAT FLOW. As seen in the drawings, the lower surface of the receptor member 12 is arcuately shaped to provide maximum receiving surface area for the heat directed thereto by the honeycomb 19.

This increase in the amount of heat radiated by the honeycomb 19 to the heat receptor member 12 will obviously tend to reduce the internal temperature of the satellite 10. Consequently, with decreasing internal temperature, the bimetallic plate 18 and honeycomb 19 return towards their respective flat configurations (FIG. 2) wherein a reduced amount of heat is radiated towards the heat receptor member 12.

In view of the above, it is seen that the amount of heat radiated by the honeycomb member 19 is directly dependent upon the amount of flexing of the bimetallic plate 18 which, in turn, is dependent upon the amount of heat (internal satellite temperature) to which the bimetallic plate 18 is exposed. Accordingly, the heat transferring apparatus provided by this invention and including the variable heat radiating or emitting honeycomb member 19 is able to effectively stabilize or regulate the internal temperature of the satellite 10, in a novel and completely pasive manner, relative to substantially any desired temperature level or range; i.e. the heat transferring apparatus is constructed to transfer different amounts of heat, for varying values of internal satellite temperature, and therefore can obviously be utilized to prevent excessively high and/or low temperatures within the satellite, as desired.

As illustrated in the drawings, the honeycomb member 19 and the inner, concave portion of the heat receptor member 12 are each enclosed by the heat insulating box 15. This insulating box 15 helps to direct any heat being radiated by the honeycomb 19 toward the receptor member 12 and thus prevents this radiated heat from being recirculated with the satellite 10.

Obviously, many modifications and variations of the present invention are possible in the light of the above teachings. It is therefore to be understood that within the scope of the appended claims the invention may be practiced otherwise than as specifically described.

What is claimed is:
1. In a heat radiating device, the combination of,
  (a) a bimetallic plate member disposed in exposed relationship to a variable amount of heat and being adapted to flex variably in accordance with the amount of heat to which it is exposed, and
  (b) radiating means constructed of heat radiating material affixed to said bimetallic plate member and configured to provide a heat radiating surface area that increases and decreases in accordance with the flexing of said bimetallic plate member.
2. The combination specified in claim 1, wherein said radiating means comprises a flexible metallic member having a honeycomb configuration which opens and closes in accordance with the flexing of said bimetallic plate member.
3. Apparatus for transferring heat from an enclosed structure comprising,
  (a) a bimetallic member disposed in exposed relationship to the internal temperature of said enclosed structure and adapted to flex variably in accordance with the internal temperature to which it is exposed,
  (b) a metallic member disposed in juxtaposition with said bimetallic member and configured with a heat radiating surface area that increases and decreases in accordance with the flexing of said bimetallic member, and
  (c) a receptor member disposed to receive the heat radiated by said metallic member for dissipating said received heat externally of said enclosed structure.
4. Apparatus for transferring heat from an enclosed structure whose internal temperature is variable, said device comprising,
  (a) a heat receptor member supported in a wall of said enclosed structure and adapted to radiate externally of said enclosed structure the heat received thereby,
  (b) a bimetallic plate member,
  (c) insulator means for insulatedly supporting opposite ends of said bimetallic plate member spaced from said heat receptor member within said enclosed structure so that said bimetallic plate member is exposed to the internal temperature thereof and is free to flex variably in accordance with said internal temperature, and
  (d) a metallic heat radiating member bonded to said bimetallic plate member facing said heat receptor member and having a honeycomb configuration which opens and closes in accordance with the flexing of said bimetallic plate member, whereby the amount of heat radiated by said metallic heat radiating member towards said heat receptor member varies directly with the internal temperature of said enclosed structure so as to stabilize said internal temperature.
5. The apparatus specified in claim 4 wherein, said bimetallic plate member is rectangular and said insulator means comprises a rectangular box of heat insulating material having open ends, one of which is affixed to said heat receptor member adjacent the wall of said enclosed structure and the other of which extends internally of said enclosed structure, said insulator box having notches formed on the inner surface of each of two opposite side walls adjacent the extending open end thereof to receive and support the said opposite ends of said rectangular bimetallic plate member, said bimetallic plate member being exposed to the internal temperature of said enclosed structure through the extending open end of said insulator box and being free to flex within said insulator box when so exposed.

6. The heat transferring apparatus specified in claim 4 wherein said metallic heat radiating member is adapted to be bent arcuately, by the flexing of said bimetallic plate member, to open the honeycomb configuration thereof, and wherein said heat receptor member is configured with an arcuate surface disposed to receive the heat radiated by said metallic heat radiating member.

References Cited

UNITED STATES PATENTS

| | | | |
|---|---|---|---|
| 3,177,933 | 4/1965 | Webb | 165—96 |
| 3,205,937 | 9/1965 | Shyffer | 165—146 |
| 3,220,647 | 11/1965 | Riordan et al. | 236—1 |

ROBERT A. O'LEARY, *Primary Examiner.*

CHARLES SUKALO, *Examiner.*